Fig.1.

Dec. 14, 1965  A. J. ATKINS ETAL  3,222,947
POWER TRANSMISSION SYSTEMS FOR VEHICLES
Filed Nov. 2, 1962  9 Sheets-Sheet 7

Fig. 7.

United States Patent Office 3,222,947
Patented Dec. 14, 1965

3,222,947
POWER TRANSMISSION SYSTEMS FOR VEHICLES
Alan J. Atkins and Albert Norman Bland, Leamington Spa, England, assignors to Automotive Products Company Limited, Leamington Spa, England
Filed Nov. 2, 1962, Ser. No. 235,065
Claims priority, application Great Britain, Nov. 8, 1961, 40,050/61
18 Claims. (Cl. 74—336)

This invention relates to power transmission systems for vehicles by means of which the power developed by an internal combustion engine is transmitted to road wheels at a ratio which can be changed to meet changing operating conditions, the changes of gear ratio being effected automatically.

It is the object of the invention to provide a compact and reliable power transmission system.

According to the invention a transmission system for transmitting the drive from an engine to road wheels of a vehicle comprises a layshaft gear assembly, a plurality of friction clutches operable to control the speed ratio between the input and output ends of said gear assembly, means responsive to vehicle speed to control the operation of said clutches, and a drive take-up device operated automatically by increase of engine speed from an idling speed.

The friction clutches are preferably grouped together to form a unit separate from the layshaft gear assembly, engagement of each one of them connecting a different member of the layshaft gear assembly to the vehicle engine.

The layshaft gear assembly may comprise a main shaft constituting the output shaft, a layshaft having fixed thereto one input and one output pinion and having mounted thereon for rotation in only one direction relative thereto a second input pinion, a larger and a smaller driving pinion both rotatable on the main shaft and meshing respectively with the fixed and relatively rotatable input pinion on the layshaft, a driven pinion rotatable on the main shaft and meshing with the output pinion on the layshaft, and dog-clutch means to couple said driven pinion to the main shaft, the smaller driving pinion being constantly driven by the vehicle engine through the drive take-up device and the larger driving pinion and the main shaft being arranged to be drivingly connected to the engine each through a different one of the friction clutches.

The larger and smaller driving pinions may be mounted on co-axial sleeves extending into the clutch unit.

The drive take-up device is preferably a centrifugal clutch.

The invention is hereinafter described with reference to the accompanying drawings in which.

Figure 1:
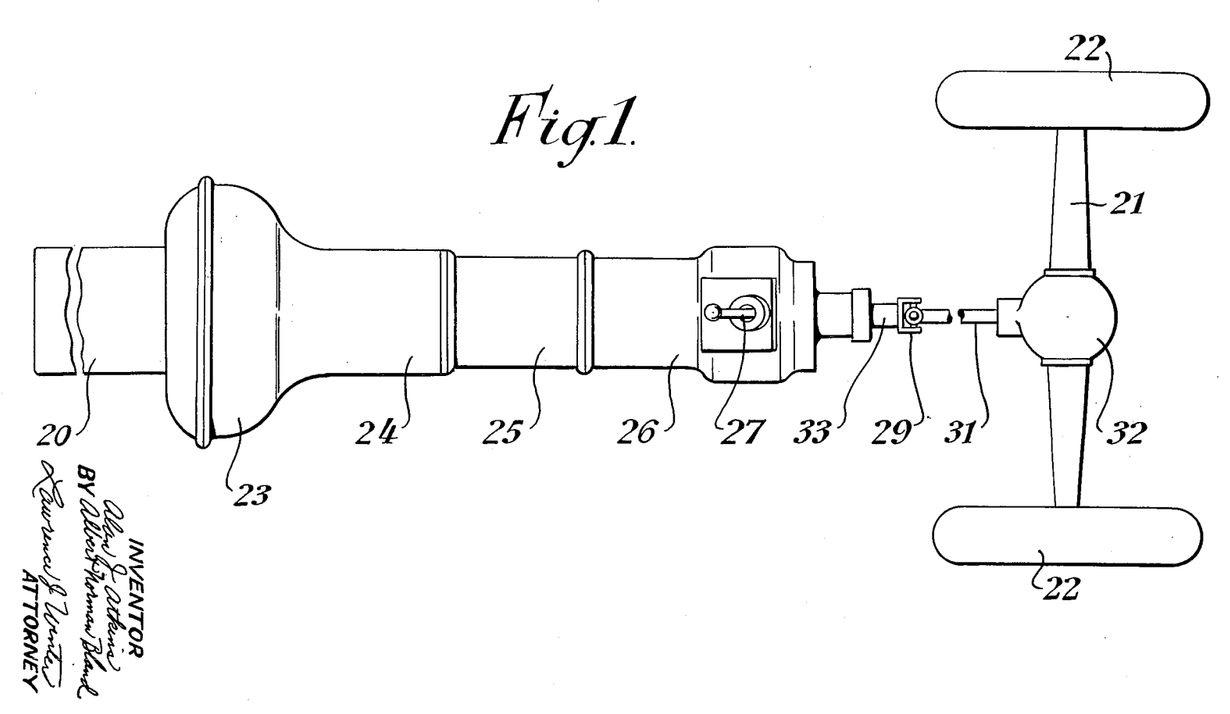
FIGURE 1 is a diagram showing the general layout of a transmission system according to the invention.

Referring to FIGURE 1, the engine of a vehicle is indicated at 20, and the rear axle at 21, the latter carrying driven road wheels 22. A bell housing 23 mounted immediately behind the engine contains an automatic drive take-up device such as a centrifugal clutch, and a housing section 24 just behind the bell housing contains a clutch unit including a plurality of clutches selectively engageable by liquid pressure means. Behind the housing section 24 is another housing section 25 in which is mounted a layshaft gear train the gear selection in which is determined by the selectively engageable clutches, and behind that again is a tail section 26 on which is mounted a manual control lever 27 for selecting forward or reverse drive. An output shaft 33 protruding from the tail section 26 is coupled by a universal joint 29 to a propeller shaft 31 driving the wheels 22 through the usual differential gear 32.

Figures 3, 10:
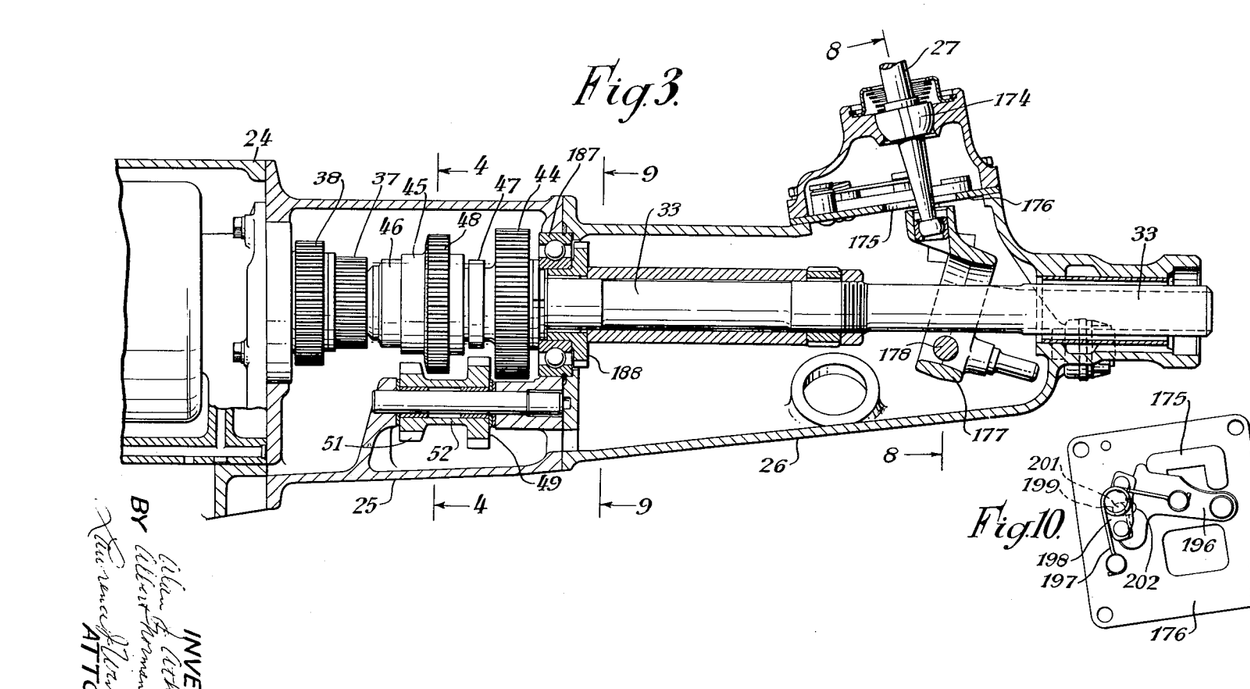
FIGURE 3 is an elevation, corresponding to FIGURE 2, of the rear part of the transmission system, some parts being shown in both figures.
FIGURE 10 shows a gate plate associated with the gear shift.
Figures 4, 8, 9:
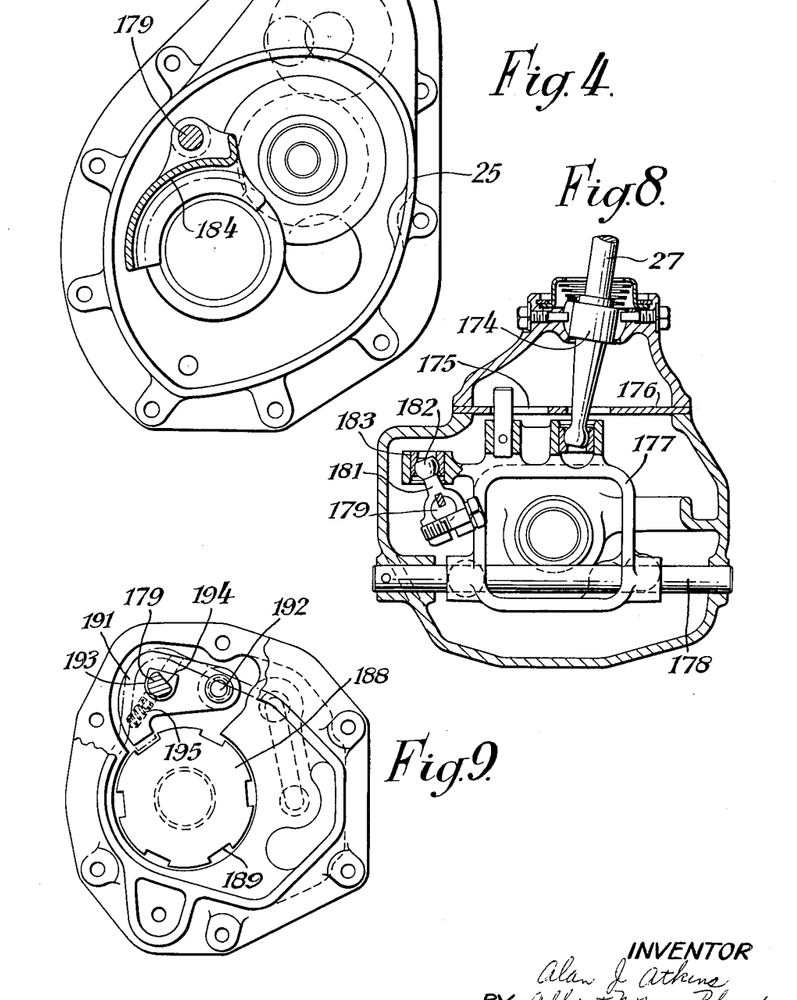
FIGURE 4 is a transverse section on the line 4—4 of FIGURE 3 showing the relative positions of the shafts of the gear reduction train.
FIGURE 8 is a sectional elevation, on the line 8—8 of FIGURE 3, of the manual gear shift mechanism for selecting forward or reverse drive.
FIGURE 9 shows a sprag for holding the transmission against rotation to serve as a parking brake on hills, and is a section on the line 9—9 of FIGURE 3.
Figure 5:
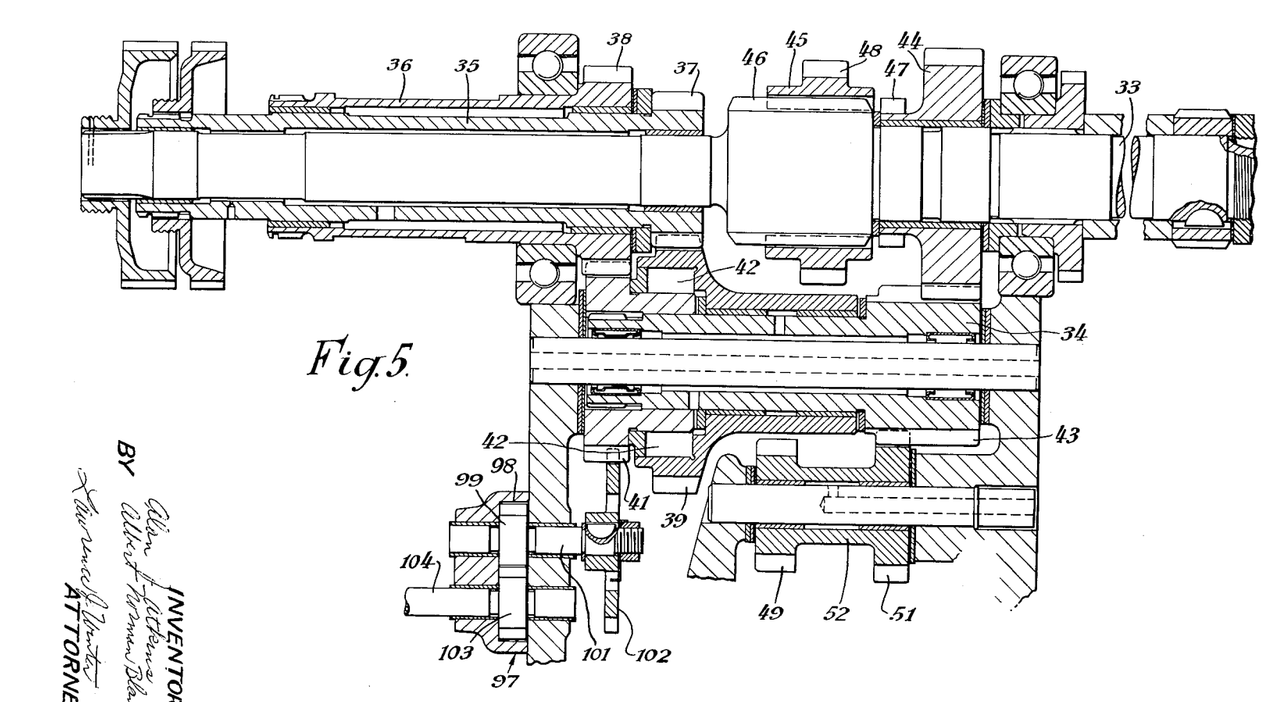
FIGURE 5 is a developed view of the gear reduction train.
Figure 6:
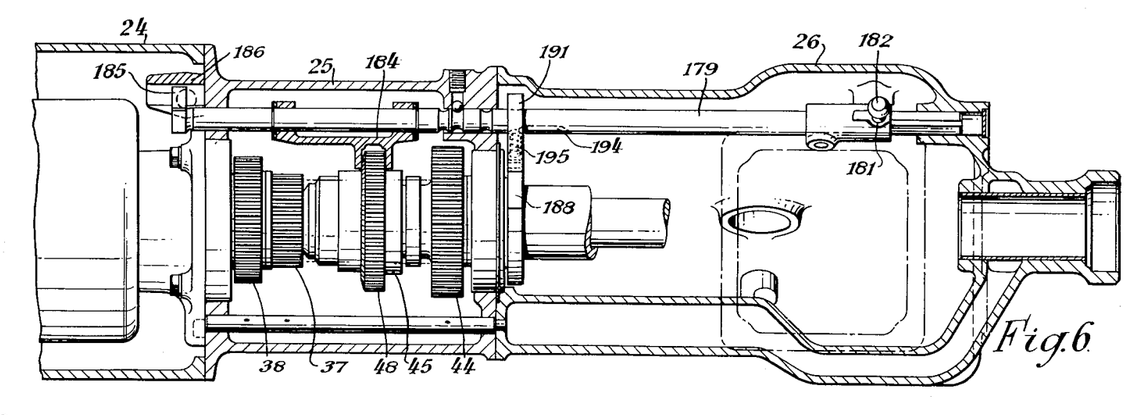
FIGURE 6 is a sectional plan of the rear part of the transmission system.
Figure 7:
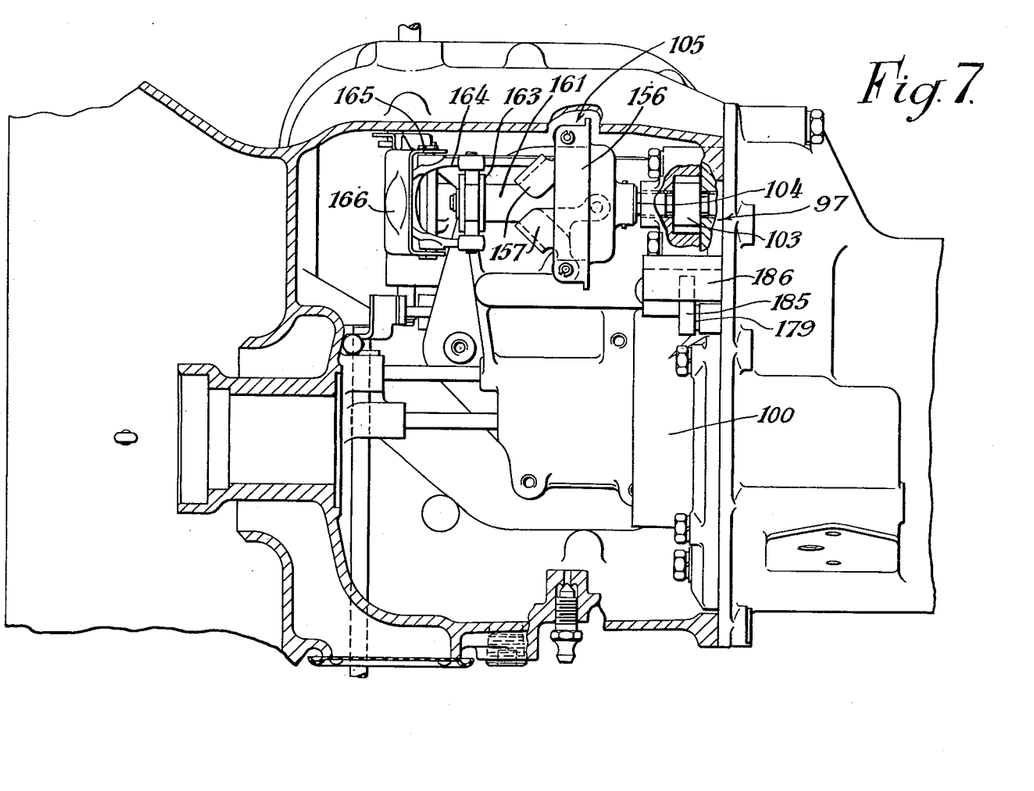
FIGURE 7 is a sectional view showing the centrifugal governor and oil pump.

The layshaft gear train, as shown in FIGURES 3, 4 and 5 comprises the output shaft 33 extending in one direction into the clutch unit housing section 24 and in the other direction through the tail section 26 of the housing, a layshaft 34 mounted alongside the output shaft 33, and coaxial inner and outer sleeves 35 and 36 rotatable about the end of the shaft 33 which extends into the clutch unit. The sleeves 35 and 36 carry respectively smaller and larger driving pinions 37 and 38, the pinion 37 being in constant mesh with a pinion 39 on the layshaft 34 and the pinion 38 being in constant mesh with a pinion 41 on the layshaft 34. The pinion 39 has interposed between it and the layshaft 34 a freewheel unit or one-way clutch 42 capable of transmitting rotation from the pinion to the layshaft in the normal direction of rotation of the said layshaft, but allowing the layshaft to overrun the pinion in that direction. The pinion 41 is fast on the layshaft 34, as is also a driving pinion 43 in constant mesh with a driven pinion 44 rotatably mounted on the output shaft 33. A splined collar 45, slidably on a splined portion 46 of the output shaft 33 is movable in one direction into engagement with dogs 47 on the driven pinion 44 to lock that pinion to the output shaft, or is movable in the other direction to mesh a gear ring 48 thereon with one of two pinions 49, 51 fast on a reverse idler sleeve 52, the other of said pinions 49, 51 meshing constantly with the driving pinion 43 on the layshaft. The true relative positions of the shaft 33, layshaft 34 and reverse idler sleeve 52 are shown in FIGURE 4, the shafts being shown all in the same plane in FIGURE 5 for convenience of illustration.

The means for moving the collar 45 to select forward or reverse drive will be described later in this specification.

Figure 2:
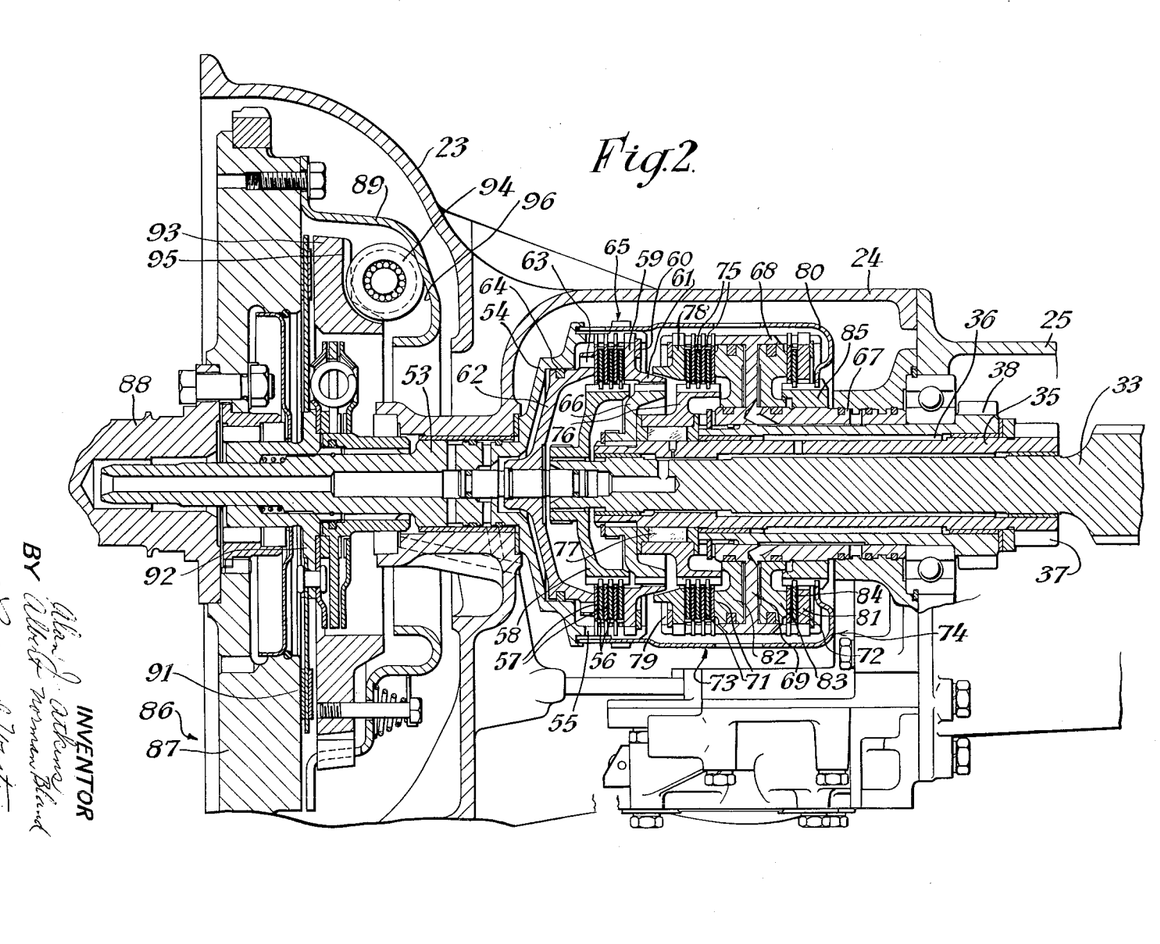
FIGURE 2 is a sectional elevation through the forward part of one form of transmission system according to the invention.

Referring now to FIGURE 2, an input shaft 53 has fixed to it a cup-shaped member 54 having a stepped peripheral wall of which the largest-diameter part 55 is slotted longitudinally to receive external lugs on clutch plates 56 interleaved with other clutch plates 57 keyed at their inner peripheries to a drum 58 fixed on the output shaft 33 of the gear train. An abutment plate 59 at one end of the stack of clutch plates 56 and 57 is retained axially in position in the cup-shaped member 54 by a split resilient ring 60 engaging an internal groove in the part 55 of the said member, the abutment plate 59 having internal with it a ring 61 formed with internal splines. A dished disc 62 slidable in the smaller-diameter part of the cup-shaped member 54 has a rim 63 which bears on the other end of the stack of clutch plates 56, 57, the disc 62 being urged towards the abutment plate 59 by liquid under pressure admitted to the interior of the cup-shaped member 54. A packing ring 64 of the piston ring type is provided on the periphery of the disc 62 to make a substantially fluid-tight sliding joint with the wall of the cup-shaped member, but allows sufficient leakage of liquid to enable liquid retained in the peripheral part of the cup-shaped member to drain away when the interior of said member is disconnected from the pump. The clutch plates 56 and 57 and their associated parts constitute a clutch hereinafter called the direct drive clutch and referred to generally by the reference 65.

The splines on the ring 61 engage with splines on a hub 66 fixed to the inner sleeve 35.

A third sleeve 67, mounted on and having a splined connection with the outer sleeve 36, has integral and concentric with it a cylindrical wall 68, the sleeve 67 and the wall 68 being connected one to the other by a disc-like web 69 dividing the annular space between the said sleeve and wall into two annular chambers disposed end-to-end. The end portions of the cylindrical wall 68 are slotted longitudinally to receive radial lugs on the outer peripheries of clutch plates 71 and 72 embodied in clutches 73 and 74 referred to hereinafter as the intermediate gear clutch and the over-run braking clutch respectively. The clutch 73 includes a second set of plates 75 having internal projections which engage with longitudinal grooves in a drum 76 mounted on the inner sleeve 35 with the interposition of a one-way clutch or freewheel device 77 which transmits rotation from the said sleeve 35 to the drum 76 in the normal direction of rotation of the said sleeve, but allows the drum to overrun the said sleeve in that direction. An abutment plate 78 for the plates of the clutch 73 has lugs engaging in the grooves of the cylindrical wall 68 and is supported axially by a spring ring 79 engaging a groove in the said cylindrical wall, and a similar abutment plate 81 is provided for the clutch 74. Both clutches 73 and 74 are engaged by liquid pressure acting on annular pistons 82 and 83 respectively mounted in the annular chambers above referred to, and having packings the piston ring type which serve the same function as the packing ring 64 above described. The plate 72 and abutment plate 81 of the clutch 74 have between them a single clutch plate 74 keyed to a ring 85 rotatable on the third sleeve 67 and having a driving connection, through a shell 80 enclosing the clutches 73 and 74, with the cup-shaped member 54.

The drive take-up device shown in FIGURE 2 is a centrifugal clutch 86. The centrifugal clutch 86 comprises a flywheel 87 fixed to the engine crankshaft 88, a cover plate 89 fixed to the flywheel 87 at its periphery, a driven plate 91 having a hub 92 in splined engagement with the driving shaft 53 of the clutch unit, and a pressure plate 93 urged to clamp the driven plate 91 between the said pressure plate and flywheel by roller weights 94 acting between radially outwardly convergent surfaces 95 and 96 on the pressure plate and cover plate respectively. The centrifugal clutch 86 is generally of conventional form and will not be described in detail herein.

The driving shaft 53 is at all times coupled, through the abutment plate 59 of the clutch 65, the ring 61 and the hub 66 to the inner sleeve 35 and pinion 37, the pinion 37 in turn having a driving connection with the pinion 44 on the output shaft 33 through the pinions 39 and 43 on the layshaft.

If the sleeve 45 is in the neutral position, no drive can be transmitted to the output shaft 33. Assuming that whilst the engine of the vehicle is idling, so that the clutch 86 transmits no torque, the sleeve 45 is moved to engage the dogs 47, and the engine is then speeded up to cause the clutch 86 to engage. The output shaft 33, and the road wheels are therefore driven, the gear ratio of the transmission being determined by the ratios between the pinions 37, 39 and between the pinions 43, 44. As the vehicle speed increases, the clutch 73 is engaged by means hereinafter described, thus transmitting rotation to the outer sleeve 36 through the one-way drive 77. The layshaft is thus driven by the pinions 38, 41 at a higher speed relative to the driving shaft 53 than when the drive was transmitted through the pinions 37, 39 and the overall gear ratio of the transmission is reduced; the pinion 39 being allowed to idle at a lower speed than the layshaft due to the presence of the one-way clutch 42.

When a still higher speed is attained by the vehicle, the clutch 65 is engaged to couple the output shaft 33 directly to the driving shaft 53 and provide a 1:1 drive ratio. The outer sleeve 36 is now driven at a higher speed than the shafts 33 and 53 through the layshaft gears 43 and 41, the said sleeve 36 being free to overrun the inner sleeve 35, which rotates as one with the shafts 33 and 53, due to the presence of the one-way clutch 77. Thus the clutch 73 can remain engaged when the clutch 65 is also engaged and there is no interruption of drive when the ratios are changed. The clutch 74, which as hereinafter described, can only be engaged when the clutch 73, but not the clutch 65, is also engaged, prevents the sleeve 36 from overrunning the sleeve 35, and so enables the engine of the vehicle to be used as a brake when the intermediate gear ratio is engaged.

Reverse drive is engaged by moving the sleeve 45 to mesh the gear ring 48 thereon with the pinion 49 on the reverse idler sleeve 52, so that the output shaft 33 is driven in the opposite direction to the driving shaft 53.

Liquid pressure to operate the clutches 65, 73 and 74 is generated by a gear pump 97 housed in a cavity 98 (FIGURES 5 and 12) in an L-shaped block 100 mounted in the casing section 24 enclosing the clutch unit, the driving gear 99 of the pump being mounted on a shaft 101 which extends into the section 25 of the casing and carries a pinion 102 meshing with the layshaft pinion 41. The driven gear 103 of the pump 97 is mounted on a spindle 104 which also carries a centrifugal governor 105. The block 100 has a flat underside against which is clamped a valve block containing various plunger-type slide valves hereinafter described and formed with grooves intersecting the valve bores to provide passages communicating therewith, the said grooves also communicating with passages in the casing section 24 which lead to the operating chambers of the various clutches. The connecting passages are shown in the accompanying drawings only in the liquid pressure circuit diagram, FIGURE 14.

Figure 14:
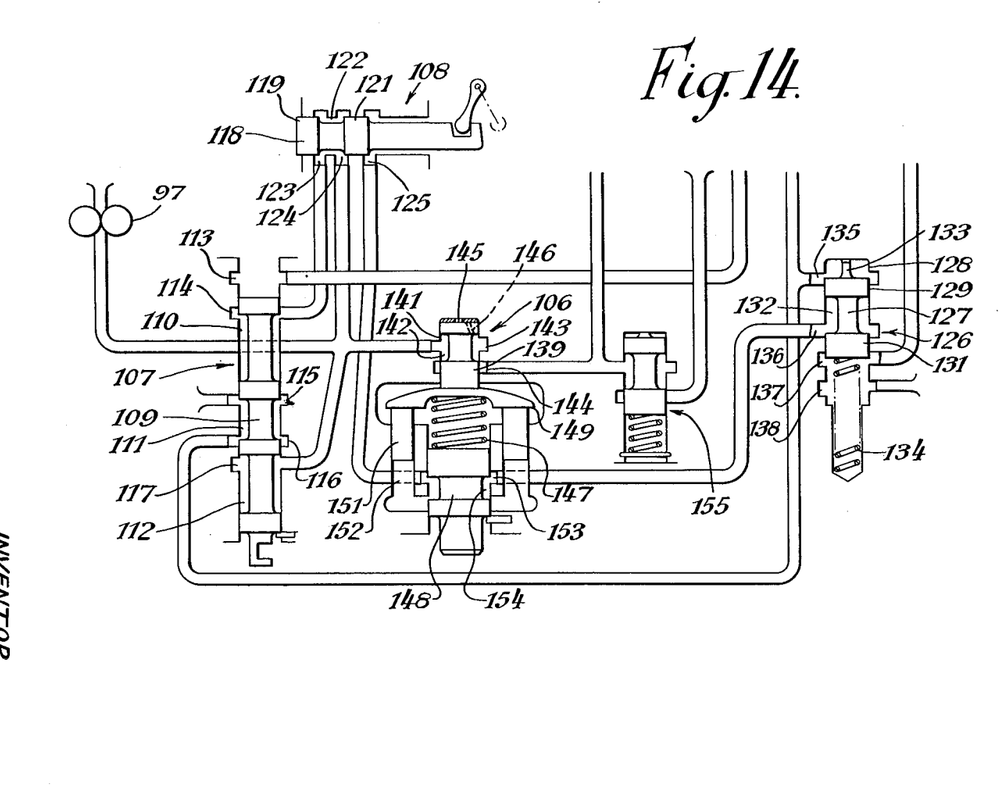
FIGURE 14 is a diagram showing the liquid pressure system of the transmission.

The gear pump 97 delivers oil under pressure to a main relief valve 106 which determines the pressure at which the oil acts to engage the clutches 65, 73 and 74. The pump also supplies such oil to a valve 107, hereinafter called the governor valve, and to a valve 108 hereinafter called the selector valve.

Figures 11, 12, 13:
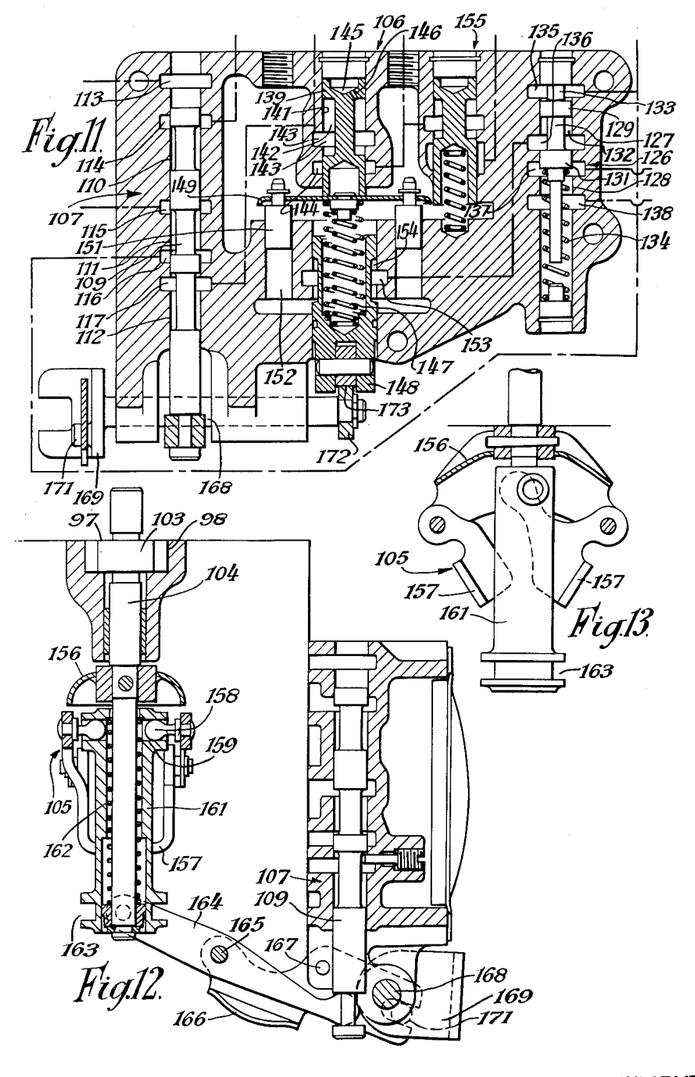
FIGURE 11 is a view showing the valve mechanism providing liquid pressure operation of the clutches in response to changes of vehicle speed.
FIGURE 12 is a view showing the connection of the centrifugal governor to a valve controlled thereby.
FIGURE 13 is a view showing details of the centrifugal governor.

The governor valve 107 comprises a plunger 109 having three axially spaced circumferential grooves 110, 111, 112 and slidable in a bore formed with five axially spaced circumferential grooves 113, 114, 115, 116, 117, the plunger 109 being coupled to the centrifugal governor as will be hereinafter described, so that it is moved along its bore in one direction as the vehicle speed increases and in the opposite direction as the vehicle speed falls.

The groove 113 is connected to the pressure chamber in which liquid acts to engage the direct drive clutch 65, the groove 114 is connected to the selector valve, the groove 115 is connected to a liquid reservoir supplying the system, the groove 116 is connected to the pressure chamber in which liquid operates to engage the intermediate gear clutch 73, and the groove 117 receives the liquid under pressure from the pump 97.

The selector valve 108 comprises a plunger 118 slidable in a bore which is conveniently formed in the L-shaped block 100, the plunger 118 having two lands 119, 121 separated by a circumferential groove 122, and the bore in which it is slidable being formed with three circumferential grooves 123, 124 and 125. The grooves 123 and 124 are connected respectively to the groove 114 of the governor valve, and to the pump 97, the groove 125, which communicates with the reservoir through one end of the valve bore when the plunger 118 is in one position, being connected to the relief valve as will be hereinafter described, and also to a third valve 126, hereinafter called the interlock valve.

The interlock valve comprises a plunger 127 slidable in a bore 128 in the valve block, the plunger 127 having two lands 129 and 131 separated by a groove 132, and having its travel towards one end of the bore limited by an axial projection 133, towards which it is urged by a spring 134. The conduit leading from the groove 116 of the governor valve to the pressure chamber of the clutch 73 is connected to a circumferential groove 135 around the bore 128 close to the end at which the projection 133 is provided. Other circumferential grooves 136, 137 and 138 around the bore 128 are connected respectively to the groove 125 in the selector valve 108, to the pressure chamber in which liquid pressure acts to engage the clutch 74, and to the reservoir of the system.

The main relief valve 106 comprises a plunger 139 slidable in a bore 141 in the valve block and having a circumferential groove 142 to connect a groove 143 receiving liquid from the pump 97 to an outlet groove 144, a closed chamber 145 in one end of the bore 141 being connected through a passage 146 in the plunger to the plunger groove 142, so that the pump pressure tends to push the plunger 139 in a direction to expose the groove 144 and increase the freedom of flow of liquid to that groove. The plunger 139 is urged in a direction to close the groove 144 by a spring 147 taking its abutment on a plunger 148 which is linked to the throttle control system of the vehicle engine so as to increase the loading of the spring 147 as the throttle valve is opened. A yoke 149 mounted on the plunger 139 carries two plungers 151 movable in cylinders 152 which receive liquid under pressure from the conduit connecting the selector valve 108 to the interlock valve 126, so that in one position of the selector valve pressure is supplied to these cylinders 152 to supplement the spring load on the main relief valve plunger 139 and increase the engaging pressure applied to the clutches. The conduit connecting the selector valve to the interlock valve is connected to a groove 153 in the bore in which the plunger 148 slides and that groove is connected to the cylinders 152 through a groove 154 in the said plunger 148, the arrangement being such that the cylinders 152 are cut off from the groove 153 when the throttle valve of the vehicle engine is wide open.

The outlet groove 144 of the main relief valve is connected to a second relief valve 155 set to open at a lower pressure than the main relief valve and to return liquid to the reservoir which supplies the liquid pressure system, a branch conduit on the upstream side of the second relief valve 155 carrying oil to various points in the transmission for lubrication purposes.

The centrifugal governor 105 includes a two-armed bracket 156 fixed to the spindle 104, each arm of the bracket having pivoted to it a weighted arm 157 which tends to swing outwardly under centrifugal force when the spindle 104 revolves. The weighted arms 157 carry studs 158 engaging in sockets 159 in a sleeve 161 slidable on the spindle 104 and urged by a spring 162 in a direction to move the weighted arms 157 inwardly. The sleeve 161 is grooved circumferentially at 163 to receive inwardly projecting pins on one end of a forked lever 164 the other end of which engages in a groove in the plunger 109 of the governor valve 107 so that the axial movement of the sleeve 161 is transmitted to the valve plunger 109. The lever 164 is pivotally mounted at 165 on another lever 166 having a fixed pivot at 167 on the valve block.

A spindle 168 mounted in the valve block and coupled to the throttle control linkage of the vehicle so as to be turned in opposite directions by the opening and closing of the throttle carries a crank plate 169 on which is mounted a crank pin 171 engaging in a forked end of the lever 166. The spindle 168 also carries a cam 172 which engages a follower roller 173 on the plunger 148 so that the spindle 168 serves to provide the variation of the spring load on the main relief valve 106 already referred to and also to move the fulcrum of the lever 164 to change the relative positions of the valve spindle 109 and the governor sleeve 161.

The plunger 109 of the governor valve 107, when the governor is not rotating or is rotating at such a low speed that the weighted arms 157 remain in their inward positions, is in such a position that the inlet groove 117 is shut off from any of the other grooves in the wall of the valve bore, the groove 116 through which liquid can be supplied to engage the clutch 73 is connected to the exhaust groove 115, the groove 114 which receives pressure liquid by way of the selector valve 108 is shut off from the other grooves, and the groove 113 through which liquid can be supplied to engage the clutch 65 is connected to the reservoir through the end of the valve bore. Increase of speed of rotation of the governor causes the plunger 109 to move so that the groove 116 is first shut off from the exhaust groove 115 and then connected to the inlet groove 117, further movement also shutting off the groove 113 from the reservoir and connecting it to the supply groove 114. The plunger 118 of the selector valve 108, in its normal position connects the grooves 123 and 124 so that liquid from the pump can reach the groove 114 of the governor valve to engage the clutch 65, but is movable to shut off the groove 124 from the groove 123 and connect it to the groove 125 so that no liquid under pressure can reach the clutch 65, but liquid is directed, through the interlock valve 126 to the clutch 74 to provide engine braking, the plunger 127 of the interlock valve 126 having been displaced to a position to connect the grooves 136, 137 of that valve by the pressure acting to engage the clutch 73.

The splined collar 45 is moved to-and-fro by manipulation of the manual control lever 27 which is mounted for universal movement on a ball joint 174 and is guided by means of a gate slot 175 in a plate 176 (FIGURE 10) so as to be movable longitudinally through a chosen distance, and to be movable laterally in the same direction at both ends of its longitudinal movement. The lever 27, at its lower end, is formed as a ball which engages a socket in a frame 177 pivotable and slidable on a shaft 178 extending across the casing section 26, so that fore-and-aft movement of the lever 27 rocks the frame 177 about its pivot and lateral movement of the said lever slides the frame along its pivot shaft. A control rod 179 pivotable and slidable in suitable bearings extends through the casing sections 26 and 25 into the casing section 24, and, adjacent its rear end, has fixed to it a radial arm 181 carrying a ball head 182 engaged in a socket 183 carried by the frame 177. A fork member 184, movable axially with the control rod 179 but held against rotation with the rod, has a channel-section fork which receives a part of the periphery of the gear ring 48 on the splined collar 45 and embraces the said gear ring so as to transmit sliding motion to it. On its forward end, in the casing section 24, the control rod 179 carries a crank arm 185 which, when the hand lever 27 is moved forwardly to engage forward drive, engages in a hook formation 186 on the plunger 118 of the selector valve 108, so that lateral movement of the hand lever moves the said valve plunger 118 to connect the groves 124 and 125 in that valve. When the hand lever 27 is moved rearwardly to engage reverse gear, the crank arm 185 moves out of the hook formation.

At the front end of the tail section 27 of the housing, and close to a supporting bearing 187, the output shaft 33 carries a disc 188 having rectangular notches 189 in its periphery. A sprag arm 191, pivoted at 192 as shown in FIGURE 9 is adapted to engage in any one of the notches 189 to lock the driven shaft 33, and with it the vehicle rear wheels, against rotation. A D-shaped hole 193 in the sprag arm 191 receives the control rod 179 which is formed with a flat 194 which lies in the said hole 193 when the control rod is in position to engage reverse gear. When the hand control lever 27 is in line with the longitudinal slot of the gate, the flat 194 in the control rod 179, and the flat side of the hole 193 are inclined one to the other as shown in FIGURE 9, and the sprag arm 191 is held clear of the notches 189, but movement of the hand control lever laterally from the reverse gear position rotates the control rod to bring the flat 194 parallel to the flat side of the hole 193, and thus allows the sprag arm 191 to drop into a notch 189 under the influence of a spring 195. When the hand control lever is in the position to engage forward drive, the flat 194 is axially spaced from the sprag arm 191, so that turning of the control rod does not allow the sprag to engage.

It is known that locking sprags used in connection with automatic transmission systems are frequently difficult to disengage when the vehicle is standing on a steep slope, the load on the sprag causing such a high frictional resistance to movement of the sprag arm out of its notch that the driver cannot exert sufficient force to disengage it. In the transmission system according to the present invention the sprag can be readily disengaged if the vehicle is facing down a slope, because the transmission is in the reverse gear position and the engine can be started and torque applied to the transmission to counterbalance the weight of the vehicle and take the load off the sprag. To avoid difficulty caused by engaging the sprag when the vehicle is facing up a steep slope, means are provided for inhibiting the engagement of the sprag under these conditions, thus leaving the driver with the choice of turning the vehicle or employing some other means of preventing it from rolling.

The inhibition of sprag engagement when the vehicle is facing up a steep slope is effected by blocking the lateral movement of the hand control lever 27 from the reverse position. As shown in FIGURE 10, the plate 176 has pivotally mounted on it an arm 196 which is urged by a spring 197 into the position shown, where it lies across the lateral limb of the gate slot 175 in line with the reverse position. A block 198 secured to the plate 176 is formed with a notch 199 in which liese a ball 201, and the arm 196 is formed with a notch 202 which, when the arm 196 is in the position shown, is opposite to the notch 199.

The plate 176, as shown in FIGURE 4, is inclined downwardly and forwardly, and the block 198 is mounted in front of the arm 196, so that, when the vehicle stands on level ground or faces forwardly up a slopt having an angle such that the plate 176 retains a forward and downward slope, the ball 201 remains in the notch 199 and the arm 196 can move to allow the sprag to engage. If, however, the vehicle faces forwardly on a steeper slope, the ball 201 rolls into the notch 202, a part of it remaining in the notch 199 so that the arm 196 is held against movement and the sprag cannot be engaged.

The sequence of events during upward gear changes, so far as the gearing and clutches are concerned, has already been described, as has also the operation of the centrifugal governor 105 and governor valve 107. It will be understood that as the speed of the vehicle falls, downward gear changes will be effected automatically in the reverse sequence. The connection of the spindle 168 to the throttle control linkage of the vehicle is such that as the engine throttle valve is opened the pivot 165 of the lever 164 is moved in a direction to move the valve plunger 109 towards its position corresponding to low gear, so that upward gear changes are delayed at large throttle openings. Further, as the throttle valve is opened, the plunger 148 serving as an abutment for the relief valve spring 147 is pushed inwardly and the loading of the relief valve increased, so that the clutches are subjected to a higher engaging pressure under full throttle conditions. The admission of liquid under pressure to the cylinders 152 when the clutch 74 is engaged to provide engine braking ensures that the liquid pressure remains relatively high to prevent slipping of that clutch although, as is usual during engine braking, the throttle may be closed or nearly closed.

We claim:

1. A power transmission system for transmitting the drive from an engine to road wheels of a vehicle, the transmission system comprising a layshaft gear assembly, a plurality of friction clutches operable by fluid pressure means to control the speed ratio between the input and output ends of said layshaft gear assembly, means responsive to vehicle speed to control the operation of said clutches, and a drive take-up means operated automatically by increase of engine speed from an idling speed.

2. A power transmission system according to claim 1, wherein the drive take-up means comprises a centrifugal clutch.

3. A power transmission system according to claim 2, wherein said friction clutches are operably grouped together in tandem to form an integral clutch compartment operably connected in tandem to a housing compartment comprising said layshaft gear assembly, wherein selective engagement of each of said clutches connects a different member of said layshaft gear assembly to the vehicle engine.

4. A power transmission system according to claim 3, wherein the layshaft gear assembly comprises a main shaft constituting the output shaft, a layshaft having a fixed thereto one input and one output pinion and having mounted thereon for rotation in only one direction relative thereto a second input pinion, a larger driving pinion and a smaller driving pinion both rotatable on the main shaft and meshing respectively with the fixed and relatively rotatable input pinion on the layshaft, a driven pinion rotatable on the main shaft and meshing with the output pinion on the layshaft, and dog-clutch means to couple said driven pinion to the main shaft, the smaller driving pinion being constantly driven by the vehicle engine through the drive take-up means and the larger driving pinion and the main shaft being arranged to be drivingly connected to the engine each through a different one of said friction clutches.

5. A power transmission system according to claim 4, wherein the larger driving pinion and the smaller driving pinion are both mounted on co-axial sleeves operably extending into the clutch compartment.

6. A power transmission system according to claim 5, wherein the larger driving pinion on the main shaft is operably driven through a one-way clutch which permits the said pinion to overrun the smaller driving pinion.

7. A power transmission system according to claim 6, wherein a further friction clutch is provided to operably couple the larger driving pinion to the vehicle engine independently of said one-way clutch.

8. A power transmission system for transmitting the drive from an engine to road wheels of a vehicle, the transmission system comprising a layshaft gear assembly, a plurality of friction disc clutches operable to control the speed ratio for at least three speeds between the input and output ends of said layshaft gear assembly, centrifugal governor means responsive to vehicle speed, fluid pressure means controlled by said governor means to selectively operate said disc clutches, and a centrifugal actuated drive take-up means operated by increase of engine speed from an idling speed.

9. A power transmission system according to claim 8, wherein the layshaft gear assembly comprises a main shaft functioning as an output shaft, a layshaft having fixed thereto one input and one output pinion and having mounted thereon for rotation in only one direction relative thereto a second input pinion, a larger driving pinion and a smaller driving pinion both rotatable on the main shaft and meshing respectively with the fixed and relatively input pinion on the layshaft, a driven pinion rotatable on the main shaft and meshing with the output pinion on the layshaft, and dog clutch means to couple said drive pinion to the main shaft, the smaller driving pinion being constantly driven by the vehicle engine through the drive take-up means and the larger driving pinion and the main shaft being arranged to be drivingly connected to the engine each through a different one of said friction clutches, clutch housing means operably connected to a layshaft gear assembly housing, co-axial sleeve means, and means wherein said larger driving pinion and said smaller driving pinion are mounted on said co-axial sleeve means, and means whereby said co-axial sleeve means of said layshaft gear assembly housing operably extends into said clutch housing means for operation thereof.

10. A power transmission system according to claim 9, wherein the larger driving pinion on the main shaft is driven through a one-way clutch which permits the said larger driving pinion to overrun the smaller driving pinion.

11. A power transmission system according to claim 10, wherein a further friction clutch is provided to couple said larger driving pinion to the vehicle engine independently of said one-way clutch.

12. A power transmission system according to claim 11, including pump means actuated by said layshaft to provide fluid pressure to selectively actuate said plurality of disc clutches by a fluid supply means connected thereto, said centrifugal governor means including valve means and means driven with the road wheels of the vehicle, said valve means acting to connect the liquid pressure means to said plurality of disc clutches in response to successively higher speeds of the vehicle.

13. A power transmission system according to claim 12, wherein, a manually operably valve is provided to prevent the supply of fluid under pressure to the clutch connecting the main shaft to the engine and to direct fluid under pressure to the further friction clutch so as to prevent the larger driving pinion from overrunning the engine.

14. A power transmission system according to claim 13, wherein the dog-clutch means and a sliding pinion of a reverse gear train are selectively engaged by movement in opposite directions of a manual control lever, the said lever being movable in a direction transverse to its direction of movement for gear engagement and from the forward drive position to operate the manually operable valve.

15. A power transmission system according to claim 14, including a sprag means and means wherein said lever is also transversely movable from the reverse drive position to engage said sprag means acting on the output shaft.

16. A power transmission system according to claim 15, wherein means are provided to prevent engagement of said sprag when the vehicle is facing upwardly on a steep slope.

17. A power transmission system according to claim 16, wherein said means comprises a securing arm obstructing a gate means in which the manual control lever is movable, and gravity responsive means are brought into operation by upward inclination of the front of the vehicle to lock said arm in the obstructing position.

18. A power transmission system for transmitting the drive from an engine to road wheels of a vehicle, the transmission system comprising a layshaft gear assembly, a manually operated forward and reverse drive means operably connected to said layshaft gear assembly, a plurality of friction clutches operable to control the speed ratio between the input and output ends of said layshaft gear assembly, centrifugal governor means responsive to vehicle speed, fluid pressure means controlled by said governor means to selectively operate said disc clutches, and a centrifugal actuated drive take-up means operated by increase of engine speed from an idling speed.

References Cited by the Examiner
UNITED STATES PATENTS

| | | | |
|---|---|---|---|
| 1,795,135 | 3/1931 | Molly | 74—336 |
| 2,620,684 | 12/1952 | McFarland | 74—330 X |
| 2,722,944 | 11/1955 | Dodge | 74—330 |
| 2,861,480 | 11/1958 | Curtis | 74—330 X |
| 2,899,834 | 8/1959 | Polomski | 74—336 X |
| 2,995,950 | 8/1961 | Peras | 74—330 X |

DON A. WAITE, *Primary Examiner.*